United States Patent
Lee et al.

(10) Patent No.: US 10,146,532 B2
(45) Date of Patent: Dec. 4, 2018

(54) APPARATUS AND METHOD FOR DETECTING CODE CLONING OF SOFTWARE

(71) Applicant: Korea University Research and Business Foundation, Seoul (KR)

(72) Inventors: Heejo Lee, Seoul (KR); Seulbae Kim, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 0 days.

(21) Appl. No.: 15/492,554

(22) Filed: Apr. 20, 2017

(65) Prior Publication Data
US 2017/0308380 A1  Oct. 26, 2017

(30) Foreign Application Priority Data

Apr. 26, 2016  (KR) .......................... 10-2016-0050845

(51) Int. Cl.
G06F 9/44       (2018.01)
G06F 8/75       (2018.01)
G06F 11/36      (2006.01)

(52) U.S. Cl.
CPC .......... G06F 8/751 (2013.01); G06F 11/3608 (2013.01)

(58) Field of Classification Search
CPC ............... G06F 8/42; G06F 8/43; G06F 8/423
USPC ........................................ 717/124, 143, 141
See application file for complete search history.

(56) References Cited

U.S. PATENT DOCUMENTS

| | | | | |
|---|---|---|---|---|
| 6,954,747 B1* | 10/2005 | Wang | ........................ | G06F 8/71 706/1 |
| 7,493,596 B2* | 2/2009 | Atkin | ........................ | G06F 8/71 717/124 |
| 7,503,035 B2* | 3/2009 | Zeidman | .................... | G06F 8/71 434/118 |
| 7,681,045 B2* | 3/2010 | Pedersen | ............... | G06F 21/602 713/153 |
| 8,255,885 B2* | 8/2012 | Zeidman | .................... | G06F 8/71 717/136 |
| 9,110,769 B2* | 8/2015 | Zhang | ..................... | G06F 8/751 |

(Continued)

FOREIGN PATENT DOCUMENTS

KR    20140001951 A     1/2014
KR    101568224 B1     11/2015

OTHER PUBLICATIONS

Roy et al., "Comarison and evaluation of code clone detection techniques and tools: A qualiative approach", 2009.*

(Continued)

*Primary Examiner* — Phillip H Nguyen
(74) *Attorney, Agent, or Firm* — Fox Rothschild LLP

(57) ABSTRACT

An apparatus for detecting code cloning of software includes a memory in which a program configured to detect code cloning from software is stored; and a processor configured to execute the program. Wherein the processor extracts multiple functions from a source code corresponding to the software, performs normalization and abstraction and compares the normalized and abstracted multiple functions with a vulnerable code clone set to determine whether there is code cloning of the software, and the vulnerable code clone set includes multiple vulnerable codes which are extracted from multiple functions included in other software, and normalized, abstracted and then stored.

8 Claims, 5 Drawing Sheets

(56) References Cited

U.S. PATENT DOCUMENTS 9,519,464 B2 * 12/2016 Dang .................. G06F 8/36
9,720,925 B1 * 8/2017 Lawson ............... G06F 17/301

OTHER PUBLICATIONS

Bellon et al., "Comparison and Evaluation of Clone Detection Tools", 2007.*
Church et al., "Dotplot: a Program for Exploring Self-Slmilarity in Millions of Lines of Text and Code", 1993.*
Ducasse et al., "On the effectiveness of clone detection by string matching", 2005.*
Kodhai et al., "Method-level code clone detection through LWH (Light Weight Hybrid) approach," Journal of Software Engineering Research and Development (2014); 2:12 (29 pages).

* cited by examiner

FIG. 4A

Level 0: No abstraction.
```
1  void avg (float arr[], int len) {
2    static float sum = 0;
3    unsigned int i;
4    for (i = 0; i < len; i++);
5      sum += arr[i];
6    printf("%f %d",sum/len,validate(sum));
7  }
```

FIG. 4B

Level 1: Formal parameter abstraction.
```
1  void avg (float FPARAM[], int FPARAM) {
2    static float sum = 0;
3    unsigned int i;
4    for (i = 0; i < FPARAM; i++)
5      sum += FPARAM[i];
6    printf("%f %d",sum/FPARAM,validate(sum);
7  }
```

FIG. 4C

Level 2: Local variable name abstraction.
```
1  void avg (float FPARAM[], int FPARAM) {
2    static float LVAR = 0;
3    unsigned int LVAR;
4    for (LVAR = 0; LVAR < FPARAM; LVAR++)
5      LVAR += FPARAM[LVAR];
6    printf("%f %d",LVAR/FPARAM,validate(LVAR));
7  }
```

*FIG. 4D*

```
   Level 3: Data type abstraction.
1  void avg (float FPARAM[], int FPARAM) {
2    DTYPE LVAR = 0;
3    unsigned DTYPE LVAR;
4    for (LVAR = 0; LVAR < FPARAM; LVAR++)
5      LVAR += FPARAM[LVAR];
6    printf("%f %d",LVAR/FPARAM,validate(LVAR));
7  }
```

*FIG. 4E*

```
   Level 4: Function call abstraction.
1  void avg (float FPARAM[], int FPARAM) {
2    DTYPE LVAR = 0;
3    unsigned DTYPE LVAR;
4    for (LVAR = 0; LVAR < FPARAM; LVAR)
5      LVAR += FPARAM[LVAR];
6    FUNCCALL("%f %d",LVAR/FPARAM,FUNCCALL(LVAR));
7  }
```

APPARATUS AND METHOD FOR DETECTING CODE CLONING OF SOFTWARE

CROSS-REFERENCE TO RELATED APPLICATION

This application claims the benefit under 35 USC 119(a) of Korean Patent Application No. 10-2016-0050845 filed on Apr. 26, 2016, in the Korean Intellectual Property Office, the entire disclosures of which are incorporated herein by reference for all purposes.

TECHNICAL FIELD

The present disclosure relates to an apparatus and a method for detecting code cloning of software.

BACKGROUND

With the recent increase of open source software (OSS) programs, some developers do not implement each functionality required for software development. Instead, they increasingly perform code cloning which means copying or reusing some or all of a code implemented in well-known open source software. Such code cloning has advantages in terms of reduction in development time and costs. Therefore, recently, many developers have used code cloning in well-known open source software when developing software.

However, code cloning may violate an open source license due to code copying which does not comply with the license policy. Also, if a bug or security defect is present in original software, the bug or security defect can also be copied by code cloning. Therefore, the same bug or security defect of the original software may also be present in code-cloned software.

In this regard, Korean Patent Laid-open Publication No. 10-2014-0001951 (entitled "Intelligent code differencing using code clone detection") discloses a technology of identifying a large and complex source code change and tracking the change using a code differencing tool.

SUMMARY

In view of the foregoing, the present solution provides an apparatus and a method for rapidly and efficiently detecting code cloning of software by narrowing down a search space for detecting code cloning based on a dictionary data structure.

However, problems to be solved by the present disclosure are not limited to the above-described problems. There may be other problems to be solved by the present disclosure.

According to a first aspect of the present disclosure, an apparatus for detecting code cloning of software includes a memory in which a program configured to detect code cloning from software is stored and a processor configured to execute the program. Herein, the processor extracts multiple functions from a source code corresponding to the software, performs normalization and abstraction and compares the normalized and abstracted multiple functions with a vulnerable code clone set to determine whether there is code cloning of the software. The vulnerable code clone set includes multiple vulnerable codes which are extracted from multiple functions included in other software, and normalized, abstracted and then stored.

According to a second aspect of the present disclosure, a method for detecting code cloning of software by an apparatus for detecting code cloning includes: extracting multiple functions from a source code corresponding to the software; performing normalization and abstraction to the extracted multiple functions; and determining whether there is code cloning of the software by comparing the normalized and abstracted multiple functions with a vulnerable code clone set. Herein, the vulnerable code clone set includes multiple vulnerable codes which are extracted from multiple functions included in other software, and normalized, abstracted and then stored.

According to the present disclosure, a source code included in software is normalized and abstracted. Therefore, even if names and data types of a function and a variable included in the source code are modified, it is possible to detect code cloning.

Further, according to the present disclosure, integer type keys of the vulnerable code clone set and those of the software are compared first, on the basis of the dictionary data structure and hash values included in a narrowed search space are compared through key search to finally detect a code clone. Therefore, time complexity can be reduced. That is, according to the present disclosure, code cloning can be detected within a constant time, so that it is possible to rapidly and efficiently detect code cloning of large open source software.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIGS. 4A, 4B, 4C, 4D and FIG. 4E (collectively referred to as "FIG. 4") are exemplary diagrams illustrating abstraction of a function.

DETAILED DESCRIPTION

Figure 1:
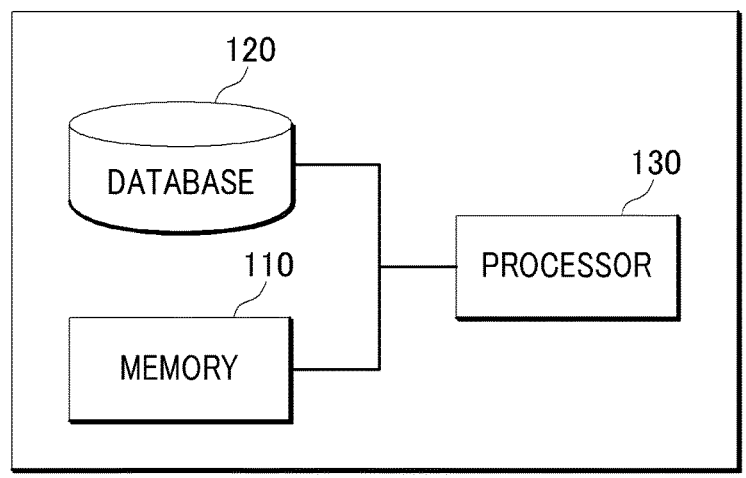
FIG. 1 is a block diagram of an apparatus for detecting code cloning of software.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Code cloning means copying some or all of a source code of other software. The code cloning can be roughly classified into four types.

The first type of code cloning is copying a source code without any modification. In this case, the original source code and a code-cloned source code are exactly identical to each other.

The second type of code cloning is modifying names or data types of some variables and functions in a source code. Therefore, the original source code and a code-cloned source code are identical to each other except data type, identifier, comment, and whitespace.

The third type of code cloning is modifying names of some variables or functions of a source code and correcting a structure of the source code. In this case, the correction of a structure may be insertion or deletion of a part of the source code or rearrangement of some sentences of the source code. Therefore, the original source code and a code-cloned source code are only partially identical to each other.

Also, the fourth type of code cloning is semantic cloning. That is, the semantic cloning means that an original source code and a code-cloned source code are semantically identical to each other but syntactically different from each other. That is, the original source code and the code-cloned source code are functionally identical to each other and thus may perform the same task.

In order to perform the third and fourth types of code cloning, i.e., correcting a part of a structure of a source code and semantically cloning a source code, it takes some time to sufficiently analyze an original source code and verify and debug an added sentence. Therefore, in order to perform the third and fourth types of code cloning, a lot of time and high-level programming technology is needed.

That is, code cloning is generally performed to save time and effort required to develop a source code. Therefore, such code cloning can be classified as the first or second type. Accordingly, an apparatus 100 for detecting code cloning of software is configured to detect the first and second types of code cloning. That is, the apparatus 100 for detecting code cloning can detect code cloning such as copying a specific function included in a source code or modifying a function name, a variable's data type, and a variable name included in a specific function and then copying the specific function by a user that performs code cloning.

Hereinafter, the apparatus 100 for detecting code cloning and a method for detecting code cloning by the apparatus 100 for detecting code cloning will be described with illustration of software developed using C language- and C++ language-based programming languages. However, programming languages are not limited thereto, and may include various programming languages such as JAVA, C#, Python, and BASIC in addition to the C language- and C++ language-based programming languages.

Hereinafter, the apparatus 100 for detecting code cloning of software will be described with reference to FIG. 1 to FIG. 4E.

FIG. 1 is a block diagram of the apparatus 100 for detecting code cloning of software.

The apparatus 100 for detecting code cloning detects whether code cloning of open source software is performed, from a source code included in specific software.

In general, software may include one or more files. The files may include functions, variables, and constants.

The function may include commands for actually performing tasks, constants, and variables. Herein, the function may become a module, a method, and a procedure depending on the programming environment in which the software is developed, but is not limited thereto.

By way of example, in the C language or C++ language, the function may be divided into a header and a main. Herein, the header includes a data type of a returned value, a function name, and data types of multiple parameters input into the function. The main includes at least one line in which a specific task is specified. If the main includes multiple lines, the main may include braces ('{', '}') and the multiple lines may be included in the braces ('{', '}').

Further, in the C language or C++ language, a line may be divided by a semicolon (';'). That is, characters prior to a semicolon (';') may form a line regardless of the appearance of a newline character ('\n').

The apparatus 100 for detecting code cloning may detect code cloning based on multiple functions included in the source code of the software. Herein, the apparatus 100 for detecting code cloning may include a memory 110, a database 120, and a processor 130. The apparatus 100 for detecting code cloning illustrated in FIG. 1 is just an exemplary apparatus implementing the present solution. Therefore, the apparatus 100 for detecting code cloning can be modified in various ways based on the components illustrated in FIG. 1.

The memory 110 stores a program configured to detect code cloning from the software. In this case, the memory 110 is a general name for non-volatile storage devices that can preserve information stored therein without electric power and volatile storage devices that need electric power to preserve information stored therein.

The database 120 may store a vulnerable code clone set for detecting code cloning. In this case, the database 120 may be connected to the apparatus 100 for detecting code cloning or may be mounted in the apparatus 100 for detecting code cloning, but is not limited thereto.

The processor 130 may determine whether there is code cloning of the software by comparing multiple functions included in the source code of the software with functions stored in the vulnerable code clone set in the database 120. In this case, the vulnerable code clone set may include a source code extracted from multiple functions of other previously collected software. Further, the vulnerable code clone set may include a source code extracted from software including a vulnerable code or a source code extracted from open source software previously defined to determine whether license rules are violated, but is not limited thereto.

Figure 2:
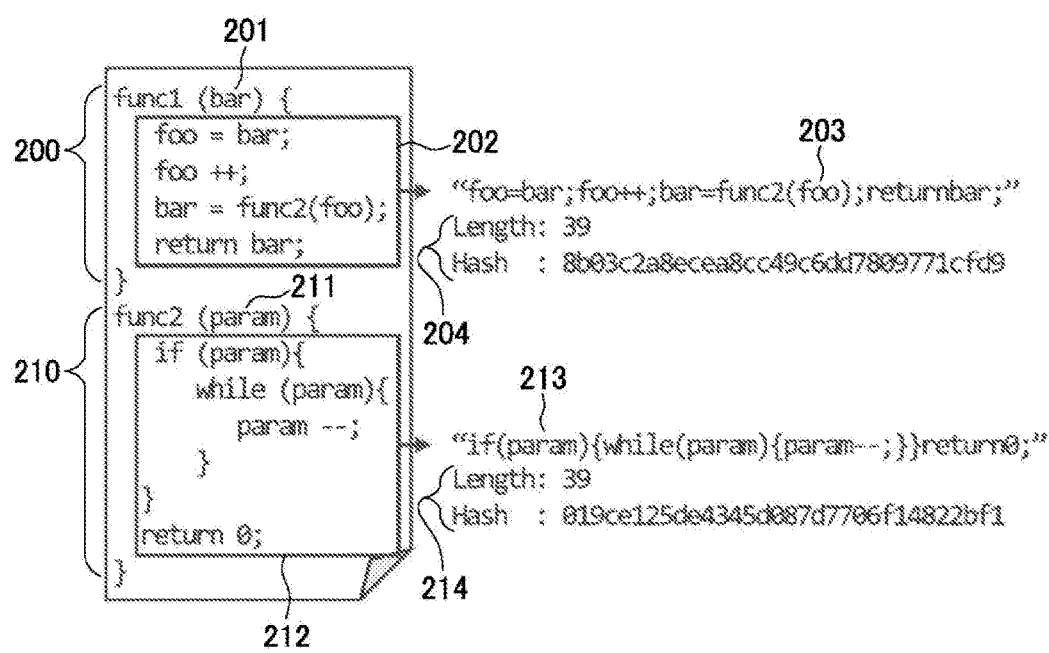
FIG. 2 is an exemplary diagram illustrating a source code of software.

FIG. 2 is an exemplary diagram illustrating a source code of software.

Referring to FIG. 2, a source code of software may include a first function 200 and a second function 210. In this case, multiple functions included in the source code may respectively include headers 201 and 211 each including a data type of a returned value, a function name, and data types of multiple parameters input into the function and bodies 202 and 212 each configured to define a task to be actually performed by the function.

For example, the first function 200 includes "func1 (bar)" as the header 201. Further, the first function 200 may include four lines, i.e., "foo=bar;", "foo++;", "bar=fun2(foo);" and "return bar;" in braces ('{', '}') below the header as the body 202.

Also, the second function 210 includes "func2 (param)" as the header 211. Further, the second function 210 may include two lines, i.e., "if(param) {while (param) {param-;}}" and "return 0;", in braces ('{', '}') below the header as the body 212.

Figure 3:
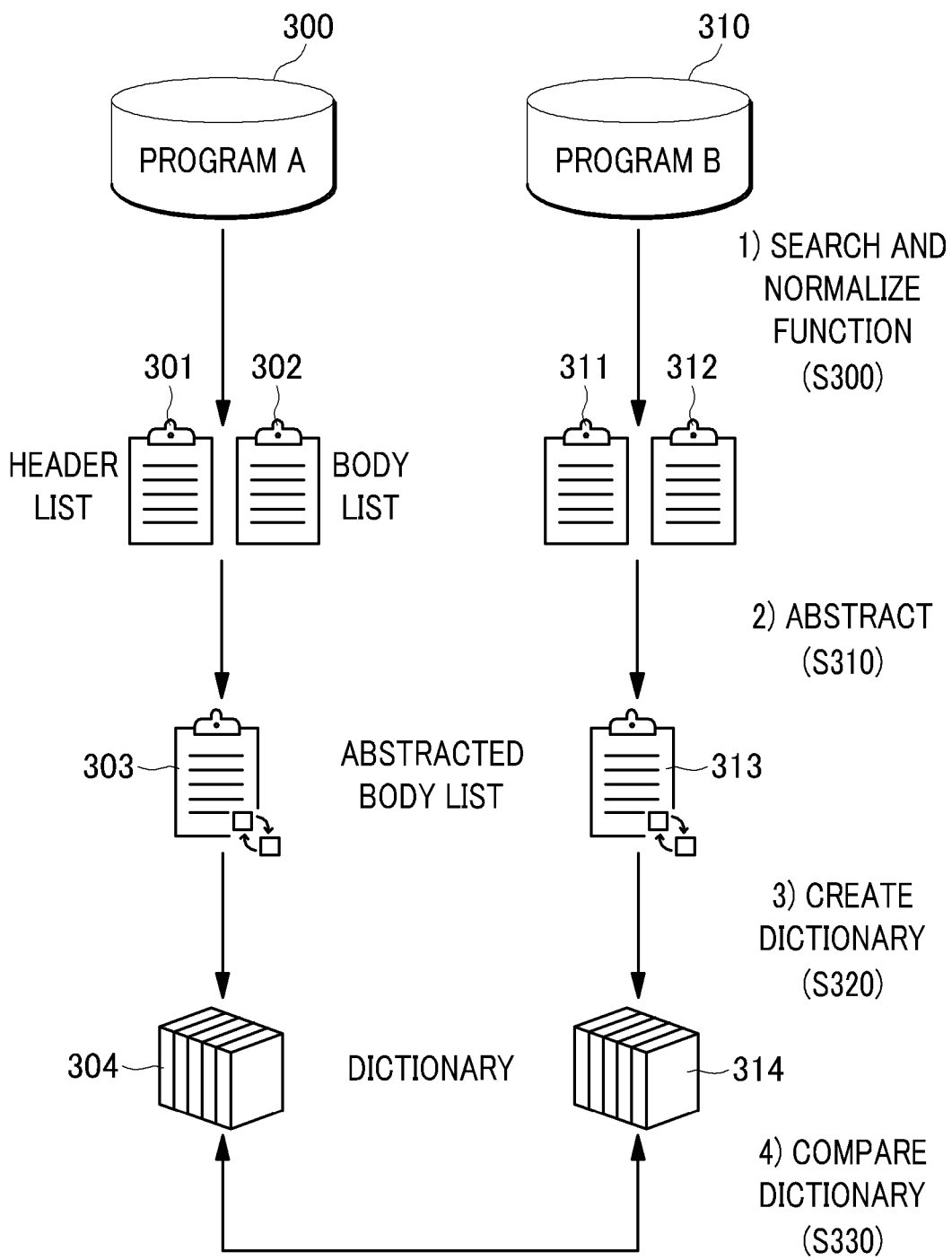
FIG. 3 is an exemplary diagram illustrating a process of detecting code cloning.

FIG. 3 is an exemplary diagram illustrating a process of detecting code cloning.

The processor 130 searches and extracts multiple functions from a source code (S300). Then, the processor 130 may perform normalization and abstraction to the extracted multiple functions (S300, S310). In this case, the processor 130 may use a parser.

In this case, the parser may be a robust parser created on the basis of fuzzy parsing. The fuzzy parsing refers to a parsing technique which can be used even if parsing is not available in a general parser due to a parsing error such as an incomplete source code or a syntax error included in a source code. That is, the fuzzy parsing is a parsing technique which can be applied to a source code without a header file, a source code including a syntax error, and a source code of which a part is removed.

By way of example, a fuzzy parsing-based parser performs parsing using an island grammar. Herein, the island grammar is a grammar that only describes a small chunk of the underlying language.

A generally used parser uses a regular expression and has a disadvantage of being unable to process a user-defined data type included in a source code. Further, the parser using a regular expression has a disadvantage of being unable to perform parsing if there is a syntax error. However, the parser can perform parsing even if a sentence included in a source is not incomplete or there is a syntax error and can also easily process a user-defined data type. Further, the parser can perform parsing even if only a part of a source code is present.

Therefore, the processor 130 may extract a function based on a parser previously defined corresponding to a programming language that detects code cloning.

Referring to FIG. 2, the processor 130 may extract "fund (bar)" as the function header 201 from "func1" which is the first function 200 and also extract a portion within the braces '{' and '}' right below the function header 201 as the function body 202. Further, the processor 130 may extract "func2 (param)" as the function header 211 from "func2" which is the second function 210 and also extract a portion within the braces '{' and '}' right below the function header 211 as the function body 212.

Furthermore, the processor 130 may perform normalization and abstraction to the extracted multiple functions. FIG. 3 illustrates that the processor 130 performs normalization to the multiple functions and then performs abstraction thereto. However, the present solution is not limited to that shown in FIG. 3. Therefore, the sequence of normalization and abstraction may vary depending on exemplary applications or implementations of the present solution.

That is, the processor 130 may perform normalization to the multiple functions and then perform abstraction thereto as illustrated in FIG. 3. Otherwise, the processor 130 may perform abstraction to the multiple functions and then perform normalization thereto.

Herein, the normalization may refer to extracting a header and a body from a function and removing an unnecessary part from a code clone included in the extracted body. Specifically, as described above, if a header and a main are separated from a function on the basis of a predetermined format, the processor 130 may remove a part unnecessary for code clone analysis from multiple lines included in the main. Herein, the part unnecessary for code clone analysis may be a whitespace character and a comment.

The processor 130 may separate a header and a main from a function using the above-described parser and remove a whitespace character and a comment. Herein, the whitespace character may include a space, a tab character, and a newline character. Otherwise, the whitespace character may also be a predetermined character in the corresponding language.

The processor 130 may perform abstraction to the normalized function.

In this case, the abstraction may be performed to detect code cloning even if a variable name and a variable data type in the function are changed by generalizing the variable name and the variable data type. In general, modifying a variable name or a variable data type by a user who clones a source code or correcting a variable data type by adding a qualifier to the variable data type is much easier than modifying another part of the source code. Therefore, such a case may occur very often.

As such, if variables included in two functions are different from each other in name or data type but source codes that actually perform a task are identical to each other, the processor 130 may determine that the two functions are code clones. To this end, the processor 130 may abstract a variable name and a variable data type and thus easily detect code cloning which is modifying a variable name and a variable data type. In this case, the processor 130 may abstract the function using the above-described parser.

The abstraction of the function may be defined into Level 1, Level 2, Level 3, and Level 4. Herein, each level may include lower levels.

In this case, Level 1 is formal parameter abstraction which refers to abstraction of a parameter included in the corresponding function. For example, according to the abstraction of Level 1, the processor 130 may abstract a parameter included in the corresponding function into a symbol, such as "FPARAM", corresponding to the parameter.

Further, Level 2 is local variable abstraction which refers to abstraction of a local variable name included in the corresponding function. In this case, Level 2 may include the abstraction of Level 1. That is, Level 2 may include the abstraction of the parameter and the abstraction of the local variable name. For example, according to the abstraction of Level 2, the processor 130 may abstract a parameter included in the corresponding function into a symbol corresponding to the parameter and abstract a local variable name included in the corresponding function into a symbol, such as "VUDDY", corresponding to the local variable name.

Level 3 is data type abstraction which refers to abstraction of a data type of a variable included in the function. In this case, Level 3 may include the abstraction of Level 1 and the abstraction of Level 2. That is, Level 3 may include the abstraction of the parameter, the abstraction of the local variable name, and the abstraction of the data type. For example, according to the abstraction of Level 3, the processor 130 may abstract a parameter included in the corresponding function into a symbol corresponding to the parameter, abstract a local variable name into a symbol corresponding to the local variable name, and abstract a data type into a symbol, such as "DTYPE", corresponding to the data type.

Further, Level 4 is function call abstraction which refers to abstraction of all of function calls included in the function. Further, Level 4 may include the abstraction of the parameter, the abstraction of the local variable name, the abstraction of the data type, and the abstraction of the function calls. For example, according to the abstraction of Level 4, the processor 130 may abstract a parameter included in the corresponding function into a symbol corresponding to the parameter, abstract a local variable name into a symbol corresponding to the local variable name, abstract a data type into a symbol corresponding to the data type, and abstract a function call into a symbol, such as "FUNCCALL.", corresponding to the function call.

Abstraction of a function will be described in detail with reference to FIG. 4A to FIG. 4E.

FIG. 4A to FIG. 4E are exemplary diagrams illustrating abstraction of a function. Herein, FIG. 4A is an exemplary diagram of an original function. FIG. 4B is an exemplary diagram of the abstraction of Level 1. FIG. 4C is an exemplary diagram of the abstraction of Level 2. FIG. 4D is an exemplary diagram of the abstraction of Level 3, and FIG. 4E is an exemplary diagram of the abstraction of Level 4.

FIG. 4A shows an original function to which abstraction of a function is not applied. A header of the function includes "arr" which is a float array and "len" which is an int array as parameters.

The processor 130 may perform abstraction by modifying a variable name of a parameter included in the header of the function into a predetermined symbol on the basis of Level 1. For example, the processor 130 may abstract a name of a variable included in a parameter of the function into a predetermined symbol, i.e., "FPARAM", corresponding to the variable included in the parameter of the function as illustrated in FIG. 4B.

In case of performing the abstraction of Level 2, the processor 130 may further perform abstraction to a local variable name included in a body of the function after performing the abstraction to the parameter of the function as illustrated in FIG. 4B. For example, the processor 130 may abstract a variable name included in the body of the function into "LVAR" as illustrated in FIG. 4C.

In case of performing the abstraction of Level 3, the processor 130 may perform abstraction to a local variable data type included in the corresponding function after performing the abstraction to the parameter of the function and the variable name as illustrated in FIG. 4C. Firstly, the processor 130 may delete a qualifier corresponding to a local variable. In this case, the qualifier may include at least one of short, long, signed, unsigned, static, extern, volatile, auto, and resister. Further, the qualifier may be predetermined for each language. The processor 130 may convert a data type such as an integer data type, e.g., int and char, a real number data type, e.g., float and double, a logic data type, e.g., bool, or a void data type into a symbol corresponding to the data type.

For example, the processor 130 may remove a qualifier "static" included in a local variable included in the body of the function as illustrated in FIG. 4D and abstract a local variable of a "float" data type and a local variable of an "int" data type into "DTYPE".

In case of performing the abstraction of Level 4, the processor 130 may perform abstraction to a function call included in the corresponding function after performing the abstraction to the variable name of the local variable and the data type of the local variable as illustrated in FIG. 4D. In this case, the function call may be a call for a function provided by the standard library included in the corresponding language or a call for a function included in an external API, but is not limited thereto. For example, the processor 130 may abstract names of a called function "printf" and a called function "validate" included in the body of the function into "FUNCCALL" as illustrated in FIG. 4E.

Referring to the original function illustrated in FIG. 4A and the function after the abstraction of Level 4 illustrated in FIG. 4E, the two functions are different from each other in a parameter name of the function, a data type of a local variable included in the function, a variable name of the local variable, and a name of a function calling another function in the function. However, the original function and the abstracted function perform the same task, i.e., receiving a real number type array and an integer type value as parameters, calculating the average of the real number type array, and outputting the average on a screen.

After performing the normalization and the abstraction to the multiple functions included in the software, the processor 130 may compare the normalized and abstracted functions with the vulnerable code clone set by expressing them using a dictionary data structure (S320).

The dictionary data structure may include a key and one or values corresponding to the key. In this case, the one or more values may be included in the form of an array or a set.

Specifically, the processor 130 may set hash values corresponding to the abstracted function as a value, and using the length of the body of the abstracted function as a key. And the processor 130 may add the value to the dictionary data structure with respect to each of the multiple functions included in the software. In this case, the processor 130 may extract a hash value corresponding to the key on the basis of a string extracted from the body of the function and a predefined hash function.

For example, the hash function may be determined to satisfy the following three conditions in order to optimize scalability and speed.

First condition: Minimize a collision of hash values calculated by the hash function.

Second condition: Set a hash function such that a hash value include a small number of bits in order to create a minimum dictionary.

Third condition: Set a hash function such that complexity of time required to create a hash value becomes O(n).

The processor may calculate a hash value corresponding to a key on the basis of the hash function satisfying the first condition, the second condition, and the third condition. In this case, the hash function satisfying the first condition, the second condition, and the third condition may be a known hash function such as MD4 (message digest 4), MD5 (message digest 5), CityHash, MurmurHash, and SpookyHash or a user-defined hash function developed to detect code cloning of software, but is not limited thereto.

There is a very low chance that multiple functions different from each other have the same result of abstraction and normalization and also have the same hash value. Therefore, in consideration of the second condition and the third condition, the processor 130 may use MD5 which is a hash function with low time complexity among the known hash functions.

Referring to FIG. 2 again, the processor 130 may set the abstracted body length "39" of the first function 200 as a key. Then, the processor 130 may calculate a hash value as "8b03 c2a8 ecea 8cc4 9c6d d780 9771 cfd9" on the basis of the abstracted body of the first function 200 and the hash function MD5.

Further, the processor 130 may set the abstracted body length "39" of the second function 210 as a key. Furthermore, the processor 130 may set a hash value as "019c e125 de43 45d0 87d7 706f 1482 2bf1" on the basis of the abstracted body of the second function 210 and the hash function.

The processor 130 may store a key and a hash value 204 for the first function 200 and a key and a hash value for the second function 210 in a dictionary corresponding to the software. In this case, the same key is set for the first function 200 and the second function 210. Therefore, the key "39" and a hash value set {"8b03 c2a8 ecea 8cc4 9c6d d780 9771 cfd9", "019c e125 de43 45d0 87d7 706f 1482 2bf1"} corresponding to the key may be actually stored in the dictionary.

Meanwhile, if a dictionary of the extracted multiple functions corresponding to the software is created, the processor 130 may detect a code clone included in the software by comparing the dictionary with the vulnerable code clone set (S330).

In this case, a source code included in the vulnerable code clone set may be stored after being normalized and abstracted. That is, the processor 130 may extract multiple functions from previously collected software before detecting a code clone of the software, and then may perform normalization and abstraction to the extracted functions. Further, the processor 130 may store the normalized and abstracted functions in the vulnerable code clone set on the basis of the dictionary data structure.

The vulnerable code clone set may include dictionaries respectively created for one or more software programs or may be a dictionary created for one or more software programs.

Further, if a dictionary including functions included in the software is created, the processor 130 may compare a key of the created dictionary with a key of the vulnerable code clone set. Then, if the key of the dictionary for the multiple functions and the key of the vulnerable code clone set are identical to each other, the processor 130 may compare values included in the respective keys.

Referring to FIG. 2 again, the processor 130 may search for a key identical to the key "39" included in the dictionary corresponding to the software, from the vulnerable code clone set. Then, if there is no key identical to the key "39" in the vulnerable code clone set, the processor 130 may determine that the software is not a code clone.

If there is a code identical to the key "39" in the vulnerable code clone set, the processor 130 may compare a hash value corresponding to the key "39" with a hash value {"8b03 . . . ", "019c . . . "} extracted from the first function 200 and the second function 210. Then, if the hash value extracted from the first function 200 and the second function 210 is not identical to the hash value corresponding to the key "39" in the vulnerable code clone set, the processor 130 may determine that the software is not a code clone. If the hash value extracted from the first function 200 and the second function 210 is identical to the hash value corresponding to the key "39" in the vulnerable code clone set, the processor 130 may determine that the software is a code clone.

As such, the processor 130 may first compare a key value of the vulnerable code clone set with a key value corresponding to a function extracted from the software on the basis of the dictionary data structure. Therefore, the processor 130 may not compare each of multiple source codes included in the vulnerable code clone set and multiple source codes included in the software. That is, the processor 130 may compare only source codes identical in key value, thereby narrowing down a search space. Further, since a key value is an integer, the processor 130 may search for a key value more rapidly than comparing a string.

Meanwhile, the processor 130 may determine whether there is code cloning of the software and then deliver the presence or absence of code cloning of the software to a user who made a request to determine whether there is code cloning. If there is code cloning of the software, the processor 130 may deliver the presence or absence of code cloning to the user together with information about open source software which is code cloned by the software and information about a cloned function.

Hereinafter, a method for detecting code cloning of software by the apparatus 100 for detecting code cloning will be described with reference to FIG. 5.

Figure 5:
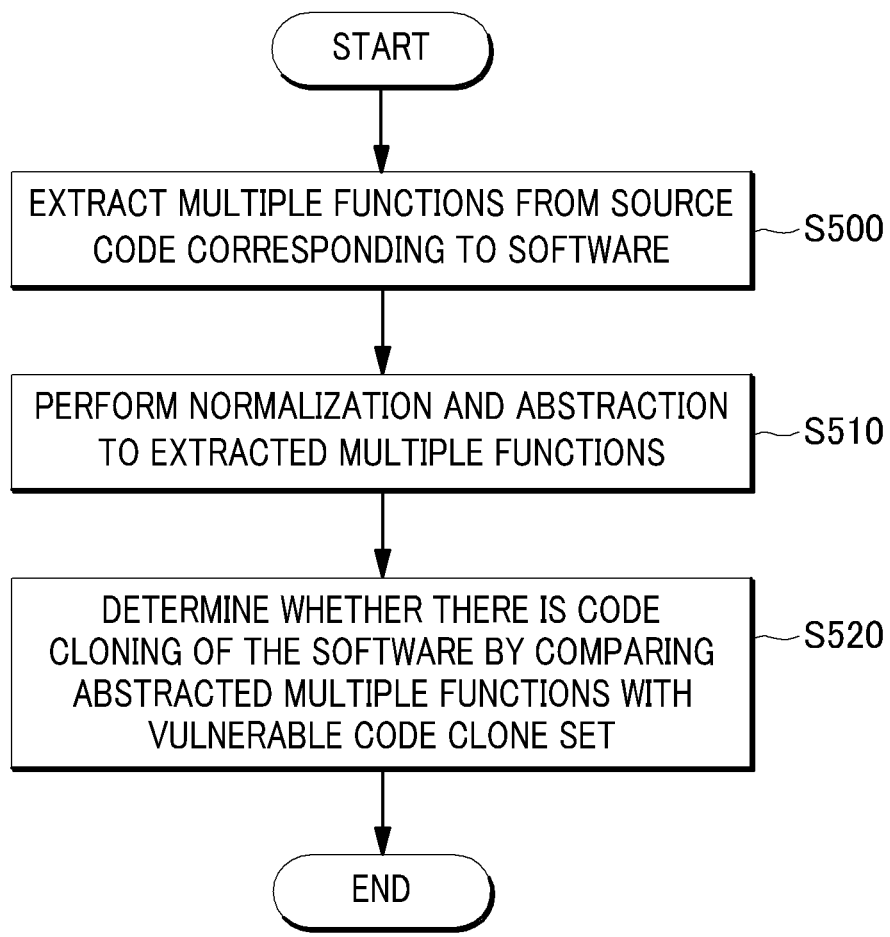
FIG. 5 is a flowchart illustrating a method for detecting code cloning of software by an apparatus for detecting code cloning.

FIG. 5 is a flowchart illustrating a method for detecting code cloning of software by the apparatus 100 for detecting code cloning.

The apparatus 100 for detecting code cloning extracts multiple functions from a source code corresponding to software (S500).

Then, the apparatus 100 for detecting code cloning performs normalization and abstraction on the basis of the extracted multiple functions (S510).

The apparatus 100 for detecting code cloning determines whether there is code cloning of the software by comparing the abstracted multiple functions with a vulnerable code clone set (S520). Herein, the vulnerable code clone set includes multiple vulnerable codes which are extracted from multiple functions included in other software, and normalized, abstracted and then stored.

Meanwhile, after performing normalization and abstraction on the basis of the extracted multiple functions, the apparatus 100 for detecting code cloning may create a dictionary for the software on the basis of the normalized and abstracted multiple functions.

In this case, the apparatus 100 for detecting code cloning may set a length of a string of the normalized and abstracted function as a key of the dictionary. Further, the apparatus 100 for detecting code cloning may set the normalized and abstracted function as a value of the dictionary.

Then, the apparatus 100 for detecting code cloning may compare the created dictionary with the vulnerable code clone set in order to determine whether there is code cloning of the software.

In this case, the vulnerable code clone set and the dictionary created for the software may be created on the basis of the dictionary data structure.

Therefore, the apparatus 100 for detecting code cloning may compare a key of the vulnerable code clone set with a key of the dictionary created for the software. Then, if the keys have the same value, the apparatus 100 for detecting code cloning may compare a value corresponding to the key of the vulnerable code clone set with a value corresponding to the key of the dictionary for the software.

Finally, if the values are identical to each other, the processor 130 may detect code cloning of the software.

In the apparatus 100 and the method for detecting code cloning of software, a source code included in software is normalized and abstracted. Therefore, even if names and data types of a function and a variable included in the source code are modified, it is possible to detect code cloning.

Further, in the apparatus 100 and the method for detecting code cloning of software, a vulnerable code clone set and an integer type key of the software are compared first on the basis of the dictionary data structure and hash values included in a narrowed search space are compared through key search to finally detect a code clone. Therefore, time complexity can be reduced to be within a constant time. That is, in the apparatus 100 and the method for detecting code cloning of software, code cloning can be detected within a constant time, so that it is possible to rapidly and efficiently detect code cloning of large open source software.

The present solution can be embodied in a storage medium including instruction codes executable by a computer such as a program module executed by the computer. Besides, the data structure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data.

The system and method of the present disclosure has been explained in relation to a specific implementation, but its components or a part or all of its operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An apparatus for detecting code cloning of software comprising:
   a memory in which a program configured to detect code cloning from software is stored; and
   a processor configured to execute the program;
   wherein the processor extracts multiple functions from a source code corresponding to the software, performs normalization and abstraction to the extracted multiple functions, sets a length of a body of each normalized and abstracted function as a key for the software and sets hash values corresponding to each normalized and abstracted function as values for the software, creates a dictionary including keys and values of the normalized and abstracted multiple functions for the software, and compares the normalized and abstracted multiple functions with a vulnerable code clone set to determine whether there is code cloning of the software;
   wherein the vulnerable code clone set includes multiple vulnerable codes which are extracted from multiple functions included in other software, and normalized, abstracted and then stored;
   wherein the vulnerable code clone set comprises keys and values according to a dictionary data structure; and
   wherein the processor compares a key included in the dictionary with a key of the vulnerable code clone set, and
   if the key included in the dictionary and the key of the vulnerable code clone set are identical to each other, the processor compares a value corresponding to the key included in the dictionary with a value of the vulnerable code corresponding to the key of the vulnerable code clone set to determine whether there is code cloning of the software, if the value corresponding to the key included in the dictionary and the value of the vulnerable code corresponding to the key of the vulnerable code clone set are identical, the processor has detected code cloning of the software.

2. The apparatus for detecting code cloning of software of claim 1, wherein the processor calculates the value corresponding to the normalized and abstracted function on the basis of a MD5 (message digest 5) algorithm.

3. The apparatus for detecting code cloning of software of claim 1, wherein
   the processor removes a whitespace character included in the extracted multiple functions and converts a character included in the function from which the whitespace character is removed into a lowercase character and then performs the normalization and abstraction, and
   the whitespace character includes a space, a tab character, and a newline character.

4. The apparatus for detecting code cloning of software of claim 1, wherein the processor coverts at least one of a data type of a local variable included in each of the extracted functions, a variable name of the local variable included in each function, a function parameter included in each function, or a function call included in each function into a predetermined symbol and performs normalization and abstraction to each function.

5. The apparatus for detecting code cloning of software of claim 4, wherein the processor changes the data type of the local variable included in each function to a first symbol, the variable name of the local variable included in each function to a second symbol, the function parameter included in each function to a third symbol, and the function call included in each function to a fourth symbol.

6. The apparatus for detecting code cloning of software of claim 1, wherein the processor extracts the multiple functions on the basis of a parser and performs normalization and abstraction to the extracted multiple functions, and the parser is on the basis of fuzzy parsing.

7. A method for detecting code cloning of software by an apparatus for detecting code cloning, the method comprising:
   extracting multiple functions from a source code corresponding to the software;
   performing normalization and abstraction to the extracted multiple functions;
   setting a length of a body of each normalized and abstracted function as a key for the software;
   setting hash values corresponding to each normalized and abstracted function as values for the software;
   creating a dictionary including keys and values of the normalized and abstracted multiple functions for the software;
   determining whether there is code cloning of the software by comparing the normalized and abstracted multiple functions with a vulnerable code clone set, wherein the vulnerable code clone set includes multiple vulnerable codes which are extracted from multiple functions included in other software, and normalized, abstracted and then stored;

wherein the vulnerable code clone set comprises keys and values according to a dictionary data structure; and wherein determining whether there is code cloning of the software includes:

comparing a key included in the dictionary with a key of the vulnerable code clone set; and determining whether there is code cloning of the software by comparing a value corresponding to the key included in the dictionary with a value of a vulnerable code corresponding to the key of the vulnerable code clone set if the key included in the dictionary and the key of the vulnerable code clone set are identical to each other, if the value corresponding to the key included in the dictionary and the value of the vulnerable code corresponding to the key of the vulnerable code are identical, the processor has detected code cloning of the software.

8. A non-transitory computer-readable storage medium that stores a program configured to execute by a processor on a computer, cause the processor to:

extracting multiple functions from a source code corresponding to the software;

performing normalization and abstraction to the extracted multiple functions;

setting a length of a body of each normalized and abstracted function as a key for the software;

setting hash values corresponding to each normalized and abstracted function as values for the software;

creating a dictionary including keys and values of the normalized and abstracted multiple functions for the software;

determining whether there is code cloning of the software by comparing the normalized and abstracted multiple functions with a vulnerable code clone set, wherein the vulnerable code clone set includes multiple vulnerable codes which are extracted from multiple functions included in other software, and normalized, abstracted and then stored;

wherein the vulnerable code clone set comprises keys and values according to a dictionary data structure; and wherein determining whether there is code cloning of the software includes:

comparing a key included in the dictionary with a key of the vulnerable code clone set; and determining whether there is code cloning of the software by comparing a value corresponding to the key included in the dictionary with a value of a vulnerable code corresponding to the key of the vulnerable code clone set if the key included in the dictionary and the key of the vulnerable code clone set are identical to each other, if the value corresponding to the key included in the dictionary and the value of the vulnerable code corresponding to the key of the vulnerable code are identical, the processor has detected code cloning of the software.

\* \* \* \* \*